Sept. 9, 1952     R. K. CADWELL     2,609,728
PIPE INSPECTING APPARATUS
Filed Nov. 1, 1949
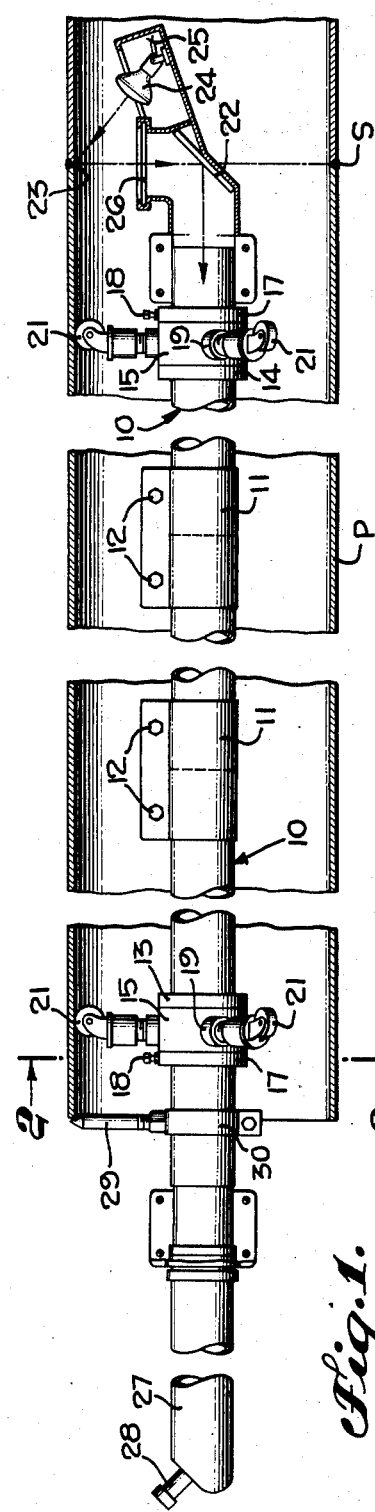
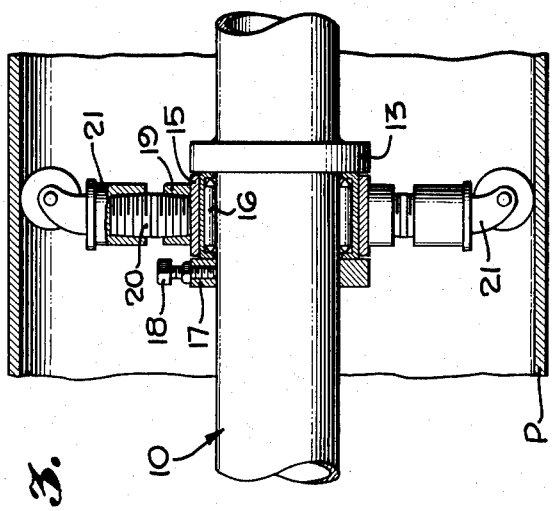
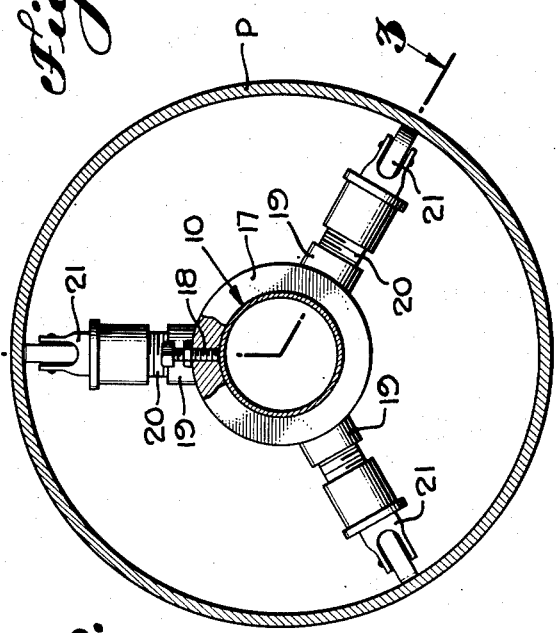
RALPH K. CADWELL,
INVENTOR.
BY
Hazard & Miller
ATTORNEYS

Patented Sept. 9, 1952

2,609,728

UNITED STATES PATENT OFFICE 2,609,728

PIPE INSPECTING APPARATUS

Ralph K. Cadwell, Alhambra, Calif., assignor to American Pipe & Steel Corporation, Alhambra, Calif., a corporation of Nevada Application November 1, 1949, Serial No. 124,837

2 Claims. (Cl. 88—71)

This invention relates to a pipe inspecting apparatus.

In the manufacture of pipe as well as the assembly of sections thereof, welding is frequently employed to weld not only longitudinal seams but circumferential seams. It is desirable to inspect the pipe from the interior to determine whether or not any defects or defective welds are present. This is particularly true where the pipe is of such small size that it is impossible for a man to enter the pipe and make a direct inspection.

An object of the present invention is to provide a simple apparatus that can be readily inserted into a pipe and which will enable either or both the longitudinal and circumferential seams to be inspected, and which will enable a defect to be accurately located on the exterior of the pipe so that correction may be made at such point or points without disturbing in any way the remainder of the pipe.

With the foregoing and other objects in view, which will be made manifest in the following detailed description and specifically pointed out in the appended claims, reference is had to the accompanying drawings for an illustrative embodiment of the invention wherein:

Figure 1 is a sectonal view through a pipe to be inspected and illustrating the inspection apparatus embodying the present invention as disposed therein;

Fig. 2 is a sectional view taken substantially upon the line 2—2 upon Fig. 1; and Fig. 3 is a sectional view taken substantially upon the line 3—3 upon Fig. 2.

Referring to the accompanying drawings wherein similar reference characters designate similar parts throughout, the pipe to be inspected is indicated at P which may have a longitudinal seam, not shown, and/or circumferential seam S which has been welded and which it is desired to inspect from the interior of the pipe.

The inspection apparatus embodying the present invention consists of a tube generally indicated at 10 which may be made up of assemblable sections of tubing that are assembled together and held rigidly in end to end relationship by clamps 11 which are tightened by means of bolts 12. The number of sections of tubing employed may vary and likewise their lengths may vary depending upon the location of the circumferential seam S from the end of the pipe through which access may be gained. On the endmost sections of the tubing 10 there are shoulders 13 and 14 against which supports for the tube can be removably positioned. Each support consists of a collar 15 within which there is an anti-friction bearing 16. This anti-friction bearing may be a ball bearing but preferably is a needle bearing enabling the tube 10 to rotate freely within its supports. Each collar 15 is retained against its shoulder by means of a ring 17 carrying a set screw 18 that can be tightened against the tubing. On loosening the set screw the ring 17 can be slipped off of the tube and the supports removed therefrom in transporting the apparatus from place to place.

On the outer side of the collars 15 there are sockets 19 for the reception of pipe nipples 20 and casters 21 are mounted on the outer ends of these nipples. The nipples 20 are replaceable by other nipples of different lengths so that the radial distance of the casters 21 from the axis of the tubing 10 can be adjusted. The casters are adjusted radially from the axis of the tubing 10 so that they will approximately fit the interior of the pipe P and hold the tubing 10 at substantially the center of the pipe. An exact fitting of the support to the interior of the pipe is not essential as reasonably satisfactory results can be obtained even though the tubing 10 is not concentrically arranged with relation to the pipe.

At one end of the tubing there is disposed a mirror or equivalent light reflecting means 22. This mirror is so arranged as to receive light from a point 23 that is radially arranged with relation to the tubing 10 and which may be on the interior of the seam S and reflect such light longitudinally of the tubing. A lamp 24 is mounted on the end of the tubing and is focused to project light on and in the vicinity of the point 23. This lamp can be an electric lamp supplied with current to conductors 25 from any suitable source. The mirror 22 may be protected by a lens 26.

At the other end of the tubing 10 an angular telescope 27 is rotatably mounted on the tubing. This telescope has an angularly disposed eyepiece 28 and is adjustable to have a focal length equal to the length of the pipe that is to be inspected. The telescope is focused on the mirror 22 so that by looking into the eyepiece 28 the tester can visually ascertain the condition of the weld at the point 23. An indicator 29 is clamped by means of a clamp 30 on the tubing and may serve as a means for rotating the tubing 10 to direct the mirror 22 to various points around the interior of the circumferential seam. The indicator 29 is clamped on the tubing 10 so as to be in direct longitudinal alignment with the point 23. Consequently, by rotating the tubing by means of the indicator 29 if a defect is located anywhere on the circumferential seam S the indicator will indicate its location on the circumference of the seam.

Preferably the indicator 29 is clamped on the tubing 10 at such a position that its point will be either in direct radial alignment with or in engagement with the edge of the pipe surrounding the opening through which the instrument is inserted. When the indicator is thus clamped on the tube it may serve not only as a means for rotating the tubing 10 within its support, but it will also serve to maintain the mirror 22 and the lamp 24 focused on the circumferential seam that is being inspected. In other words, by maintaining the indicator 29 in engagement with the end edge of the pipe the mirror and its lamp can be kept from wandering from the circumferential seam in the course of inspection.

In inspecting longitudinal seams, the indicator 29 is clamped on the tubing 10 in such a position so as to be spaced a definite or known distance from the point 23 on which the lamp 24 and the mirror 22 are focused. The tubing is then slowly introduced into the pipe and held against rotation by the indicator 29, causing the point 23 to slowly progress along the longitudinal seam. If a defect in the longitudinal seam is observed its location can be marked by measuring on the exterior of the pipe the predetermined or known distance between the indicator and the point 23. This distance is laid off from the indicator 29 on the exterior of the pipe and corrective measures are taken to correct the defect. The indicator 29 may thus serve to perform several functions including a means for rotating the tubing 10 to cause the point 23 to progress around a circumferential seam to indicate the position of a defect on a circumferential seam after it has been observed through the telescope and to serve as a reference point from which the location of a defect on a longitudinal seam can be measured. As above explained, when the indicator is in engagement with the edge of the pipe it also serves as a guide for keeping the lamp and mirror focused on the circumferential seam when a circumferential seam is inspected.

It will be appreciated from the above described construction that the improved inspection apparatus will enable the longitudinal and circumferential seams in pipes to be easily inspected and where defects are observed, it will enable the pipe to be externally marked to locate such defects so that corrective measures may be taken. Although the tubing 10 can be freely rotated through 360° in the course of making the inspection of a circumferential seam as the telescope is not rotated with the tubing, it is quite easy to look downwardly into the telescope in all positions of the tubing in the course of making an inspection. Although the telescope remains stationary to facilitate looking into the telescope when a defect is observed its location can be easily determined accurately from the position of the indicator 29.

Various changes may be made in the details of construction without departing from the spirit and scope of the invention as defined by the appended claims.

I claim:

1. A pipe inspecting apparatus comprising a tube, supports for the tube for supporting the same within a pipe, said supports having casters adjustably mounted at circumferentially spaced points thereon, anti-friction bearings between the tube and said supports, a mirror on one end of the tube arranged to receive light from a point radially with respect to the tube, means for projecting light on said point, a telescope rotatably mounted on the other end of said tube, and an indicator on the tube in longitudinal alignment with said point.

2. A pipe inspecting apparatus comprising a tube made up of sections clamped in longitudinal alignment, supports rotatably mounted upon said tube, said supports having radially adjustable casters thereon adapted to engage the interior of a pipe to be inspected, a mirror at one end of the tube adapted to receive light from a point radially of the tube, a lamp mounted on the tube focused to project light in the vicinity of said point, a telescope having an angularly disposed eyepiece rotatably mounted on the other end of the tube, and an indicator clamped upon the tube adjacent the telescope in longitudinal alignment with said point.

RALPH K. CADWELL.

REFERENCES CITED

The following references are of record in the file of this patent:

UNITED STATES PATENTS

| Number | Name | Date |
| --- | --- | --- |
| 1,602,233 | Lyon | Oct. 5, 1926 |
| 2,251,739 | Huntsinger | Aug. 5, 1941 |
| 2,363,701 | Soetbeer | Nov. 28, 1944 |
| 2,418,799 | Willard | Apr. 8, 1947 |

FOREIGN PATENTS

| Number | Country | Date |
| --- | --- | --- |
| 3,459 | Great Britain | Feb. 12, 1912 |